(12) United States Patent
Baggett et al.

(10) Patent No.: US 9,600,806 B2
(45) Date of Patent: Mar. 21, 2017

(54) ELECTRONIC MESSAGE SYSTEMS AND METHODS

(75) Inventors: David M. Baggett, Potomac, MD (US); Simon Gregory Smith, Arlington, VA (US)

(73) Assignee: Arcode Corporation, Bethesda, MD (US)

(*) Notice: Subject to any disclaimer, the term of this patent is extended or adjusted under 35 U.S.C. 154(b) by 1002 days.

(21) Appl. No.: 13/020,164

(22) Filed: Feb. 3, 2011

(65) Prior Publication Data

US 2011/0191693 A1  Aug. 4, 2011

Related U.S. Application Data

(60) Provisional application No. 61/301,188, filed on Feb. 3, 2010.

(51) Int. Cl.
*G06F 7/00* (2006.01)
*G06F 17/30* (2006.01)
*G06Q 10/10* (2012.01)

(52) U.S. Cl.
CPC ..... *G06Q 10/107* (2013.01); *G06F 17/30705* (2013.01)

(58) Field of Classification Search
CPC .......... G06F 17/3089; G06F 17/30038; G06F 17/2785; G06F 17/30463; G06F 17/30545; G06F 17/30719
See application file for complete search history.

(56) References Cited

U.S. PATENT DOCUMENTS

| | | | |
|---|---|---|---|
| 6,057,841 A | 5/2000 | Thurlow et al. | |
| 6,327,046 B1 | 12/2001 | Miyamoto et al. | |
| 6,553,358 B1 | 4/2003 | Horvitz | |
| 6,581,050 B1 | 6/2003 | Horvitz et al. | |
| 6,622,160 B1 | 9/2003 | Horvitz | |
| 6,668,281 B1 | 12/2003 | Ayyadurai | |
| 6,697,998 B1 | 2/2004 | Damerau et al. | |
| 6,714,967 B1 | 3/2004 | Horvitz | |
| 6,718,367 B1 | 4/2004 | Ayyadurai | |

(Continued)

FOREIGN PATENT DOCUMENTS

| | | |
|---|---|---|
| EP | 1679621 A1 | 7/2006 |
| EP | 1852789 A1 | 11/2007 |
| WO | 01/069432 A3 | 12/2002 |

OTHER PUBLICATIONS

"CMAIL Launches "Smart" Email Productivity Solution Designed to Help Business and Government Users Solve the Email Overload Problem and Speed Decision Making", Business Instruments Corp. New York, NY 10118, Oct. 27, 2008, 3 Pages.

*Primary Examiner* — James Trujillo
*Assistant Examiner* — John J Morris
(74) *Attorney, Agent, or Firm* — Garrett IP, LLC (57) ABSTRACT

Methods and systems to process computer readable electronic messages, such as electronic mail messages or e-mail. Methods and system include auto-tagging based on one or more of statistical machine learning based clustering techniques, custom parsers, and crowd-sourced message tagging. Methods and systems further include relevancy determination based on combinations of features, user-configurable hybrid web browser/e-mail client rendering, tabbed rendering, plug-in based local computational features, implied social graph based decision making, and automatic detection of account settings.

78 Claims, 3 Drawing Sheets

(56) References Cited

U.S. PATENT DOCUMENTS

| | | |
|---|---|---|
| 6,718,368 B1 | 4/2004 | Ayyadurai |
| 7,013,427 B2 | 3/2006 | Griffith |
| 7,016,937 B1 | 3/2006 | Malik |
| 7,024,455 B2 | 4/2006 | Yokobori et al. |
| 7,089,241 B1 | 8/2006 | Alspector et al. |
| 7,099,855 B1 | 8/2006 | Nelken et al. |
| 7,200,592 B2 | 4/2007 | Goodwin et al. |
| 7,266,535 B1 | 9/2007 | Nelken et al. |
| 7,386,520 B2 | 6/2008 | Hehl et al. |
| 7,398,261 B2 | 7/2008 | Spivack et al. |
| 7,406,449 B2 | 7/2008 | Horvitz et al. |
| 7,412,483 B2 | 8/2008 | Kushmerick et al. |
| 7,417,650 B1 | 8/2008 | Horvitz |
| 7,743,051 B1* | 6/2010 | Kashyap et al. ............ 707/713 |
| 7,978,068 B1* | 7/2011 | Caplan et al. ............ 340/539.32 |
| 2002/0054117 A1 | 5/2002 | Van Dantzich et al. |
| 2002/0107926 A1 | 8/2002 | Lee et al. |
| 2002/0144026 A1 | 10/2002 | Dunlap et al. |
| 2002/0188683 A1 | 12/2002 | Lytle et al. |
| 2003/0020749 A1 | 1/2003 | Abu-Hakima et al. |
| 2003/0046421 A1 | 3/2003 | Horvitz et al. |
| 2003/0187937 A1 | 10/2003 | Yao et al. |
| 2003/0191760 A1 | 10/2003 | Cameron et al. |
| 2004/0002932 A1 | 1/2004 | Horvitz et al. |
| 2004/0054744 A1 | 3/2004 | Karamchedu et al. |
| 2004/0098460 A1 | 5/2004 | Hehl et al. |
| 2004/0220893 A1 | 11/2004 | Spivack et al. |
| 2005/0204001 A1 | 9/2005 | Stein et al. |
| 2006/0010217 A1 | 1/2006 | Sood |
| 2006/0047548 A1 | 3/2006 | Ulmer et al. |
| 2006/0092920 A1 | 5/2006 | Karamchedu et al. |
| 2006/0100874 A1 | 5/2006 | Oblinger et al. |
| 2006/0206573 A1 | 9/2006 | Horvitz et al. |
| 2006/0242164 A1 | 10/2006 | Evans et al. |
| 2006/0253418 A1 | 11/2006 | Charnock et al. |
| 2007/0011155 A1 | 1/2007 | Sarkar |
| 2007/0038705 A1 | 2/2007 | Chickering et al. |
| 2007/0143298 A1 | 6/2007 | Surendran et al. |
| 2007/0143472 A1 | 6/2007 | Clark et al. |
| 2007/0214149 A1 | 9/2007 | Bodin et al. |
| 2007/0276866 A1 | 11/2007 | Bodin et al. |
| 2008/0082463 A1 | 4/2008 | Cheng et al. |
| 2008/0082466 A1 | 4/2008 | Meijer et al. |
| 2008/0104099 A1 | 5/2008 | Walczak et al. |
| 2008/0126951 A1 | 5/2008 | Sood et al. |
| 2008/0133486 A1 | 6/2008 | Fitzgerald et al. |
| 2008/0133501 A1 | 6/2008 | Andersen et al. |
| 2008/0133581 A1 | 6/2008 | MacVarish |
| 2008/0140679 A1 | 6/2008 | Deyo et al. |
| 2008/0140701 A1 | 6/2008 | Kulbaba |
| 2008/0154883 A1 | 6/2008 | Chowdhury et al. |
| 2008/0177726 A1 | 7/2008 | Forbes et al. |
| 2008/0189273 A1 | 8/2008 | Kraftsow et al. |
| 2008/0189336 A1 | 8/2008 | Prihodko |
| 2008/0189600 A1 | 8/2008 | Lau et al. |
| 2008/0195664 A1 | 8/2008 | Maharajh et al. |
| 2008/0201348 A1 | 8/2008 | Edmonds et al. |
| 2008/0208922 A1 | 8/2008 | Wolas-Shiva et al. |
| 2008/0215697 A1 | 9/2008 | Kushmerick et al. |
| 2008/0228811 A1 | 9/2008 | Drews et al. |
| 2008/0307077 A1* | 12/2008 | Langoulant et al. ......... 709/222 |
| 2009/0024589 A1 | 1/2009 | Sood et al. |
| 2009/0254572 A1* | 10/2009 | Redlich et al. ............... 707/10 |
| 2010/0268585 A1* | 10/2010 | Padveen et al. ........... 705/14.16 |

* cited by examiner

ELECTRONIC MESSAGE SYSTEMS AND METHODS

RELATED APPLICATIONS

This application claims the benefit of U.S. Provisional Patent Application No. 61/301,188, titled, "Electronic Message Systems and Methods," filed Feb. 3, 2010, which is incorporated herein by reference in its entirety.

BACKGROUND

Businesses and individuals may establish multiple electronic mail (e-mail) accounts with different hosts or service providers.

Some conventional e-mail interface systems are configurable for multiple e-mail accounts. For each account, however, a user must often enter a myriad of information, such as a login name, a domain, incoming and outgoing server names, port numbers, and security settings. This is time consuming and prone to error, and can be especially challenging to less experienced users.

Businesses and individuals may receive relatively large numbers of e-mail messages within a given period of time, and may find it difficult sort through the messages efficiently.

Conventional e-mail systems provide relatively limited abilities to pre-sort e-mails. Examples include binary junk or spam filters, and tagging based on user-specified attributes, such as sender e-mail address or key words.

While techniques to analyze limited features e-mails may be found in publications, few if any of the techniques appear to have been successfully implemented in an e-mail client, and none teach a user-friendly e-mail client to automatically discover account settings or to organize e-mails in an intuitive way based on a rich variety of features with little or no user input.

SUMMARY

Disclosed herein are methods and systems to discover electronic message account settings.

Also disclosed herein are methods and systems to analyze and organize electronic messages based on one or more of a variety of types of information and features.

BRIEF DESCRIPTION OF THE DRAWINGS/FIGURES

In the drawings, the leftmost digit(s) of a reference number identifies the drawing in which the reference number first appears.

DETAILED DESCRIPTION

For illustrative purposes, features may be disclosed herein with reference to an electronic mail (e-mail) messages and/or with respect to an e-mail messaging client, referred to herein as Arcode Mail, or Arcode, to organize electronic messages. Whereas current e-mail clients present a simple list of messages, Arcode may be implemented to automatically parse and tag messages, and rank messages for relevancy, to provide richer presentation and search capabilities.

Features disclosed herein are not, however, limited to e-mails and/or to an e-mail client, and may be implemented with respect to other forms of electronic messaging.

One or more features disclosed herein may be implemented alone and/or in various combinations with one another.

Tags

Arcode may treat message analogously to MP3 music files.

Arcode may associate one or more tags with each message, and the tags may include and/or provide semantic information about the message. For example, a shipping confirmation message from Amazon.com might be tagged "type: online order" and "vendor: Amazon." Arcode may determine tags with one or more techniques, which may include a statistical machine learning technique and/or parsers.

A statistical machine learning technique may be implemented to cluster similar messages and to select a representative phrase as a tag.

Parsers may be targeted to certain kinds of machine-generated messages, such as merchant-specific shipping confirmations.

Relevancy

Arcode may estimate how important and/or timely a message is to the user or recipient. Whereas spam filtering is binary—a message is spam or it's not—the notion of relevancy in Arcode implies a continuum. Intuitively, a message may be more or less relevant without being spam.

Arcode may be configured to examine a combination of features to ascertain the relevancy of a message. The combination of features may include one or more of:

the sender and other recipients;
relationship (a) between the sender and the recipient in terms of an "implied social graph" connecting parties with whom the sender and/or recipient have sent and/or received e-mail in the past;
other message headers;
syntactic structure of the message;
language of the message and/or character used in the message;
prior action(s) taken by recipient in response to similar messages (e.g., immediately deleted, ignored, forwarded, replied, etc.); and
prior action(s) taken by other users in response to similar messages (i.e., crowd-sourced based actions: how one client uses this information may depend on relation(s) between users derived from the social graph (see Use of Implied Social Graph below).

Rendering

Arcode may include a hybrid of web browser and email client, such as to permit developers to extend Arcode with arbitrary HTML and/or JavaScript pages that render information pulled from tagged messages. For example, an extension could place a tab in client user interface (UI) showing the user's online ordering history: everything they've bought online, and the status of each purchase.

The Arcode UI may include manipulable controls. For example, an online orders page may include a package tracking button to check the status via a third party shipping site (e.g., UPS or FedEx websites).

As additional examples, tab renderers may be configured with respect to one or more of:

online purchases;
travel;
invitations;
newsletters;
offers/promotions;
upcoming meetings;
project XYZ;
bills/online payments;
banking/finance items;
emails requiring a response;
"Breaking News": highly relevant informational messages; and
"Urgent": highly relevant messages requiring immediate action.

A renderer may combine intelligent presentation of information in the user's inbox with collaborative editing of shared web documents. For example, a renderer for "party invitations" may track invitations in the user's inbox, and may further permit users to establish a shared event invitation web page that Arcode users could manipulate (such as to accept/decline the invitation, for example), in a "first-class" way. Recipients of e-mails linked to such collaborative objects using other e-mail clients may receive "downgraded" text-only versions to convey the content in a backward-compatible way. Such users may be prompted to upgrade with an Arcode system.

Tabbed Browsing of Renderers

An Arcode UI may include a set of user-selectable tabs, analogous to browser tabs used for tabbed browsing. Each tab holds a different view of the person's inbox. The Arcode UI may include a "classic view" tab, to present messages as in a conventional email client. The UI may include the classic view tab by default, and may permit a user to select one or more other tabs to include in the UI.

Arcode may combine relatively powerful rendering technologies available on the public web and information that exists in the user's private message store.

Extensibility; Local Computation

Arcode may be configured to allow arbitrary extensions, which may be written in Python. This may permit a developer and/or end user to write new code, such as to parse and tag messages, to influence relevancy estimation, and/or to render tagged local content. A Python environment may be hosted within a browser plug-in, so that corresponding computations occur on the user's machine rather than at a remote server farm.

Use of Implied Social Graph

An "implied social graph" is a network of connections implied by recursively following links between people implied by sending and receiving email. This is more than "degrees of separation" between a sender and a recipient, and may be performed with respect to a relatively whole graph and may include stored information about each link along the shortest path between the two.

Arcode may be configured to use an implied social graph in one or more ways.

An implied social graph may be used in determining message relevancy. For example, if a low degree of separation user has sent mail to a particular person, the relevance of messages from that person may be deemed relatively higher. Likewise, if a similar message has been sent to a very large number of people, as tracked by the global graph data structure, the message is may be deemed relatively low relevancy.

An implied social graph may be used to formalize certain intuitive notions about information propagation. For example, information learned from a user about how to tag or estimate the relevance of the user's messages, may be shared with other neighbors in the social graph on the assumption that people near each other in this graph conceptually have more things in common.

Crowd-Sourced Message Tagging

Arcode may be configured to implement crowd-source tagging. Machine-generated messages, such as merchant confirmation messages, often follow relatively rigid structures. Arcode may permit end-users or message recipients to tag portions of such messages with semantic information using a graphical user interface. For example, a user might highlight "$150.25" and tag it "price." Users can then contribute taggings to a central repository to be aggregated and shared with others. In this way, Arcode may improve over time via contributions of its users, analogous to Wikipedia. Crowd source tagging may also permit Arcode to adapt to changes in messages, which may not be accommodated with existing taggers.

Hand-Written Taggers

Arcode may be configured to permit developers to write taggers, such as in Python code. Taggers may be configured to run arbitrary computations, and to do perform tasks, such as accessing network resources. For example, an Amazon tagger could query the Amazon web service to determine whether a particular string actually refers to a product for sale on Amazon's site, to help disambiguate the parsing of the message.

Automatic Tagging of Similar Messages

Arcode may be configured to permit an end user or message recipient to click on a message and select "automatically tag messages like this one." Arcode may be further configured to utilize machine learning clustering to identify similar messages, to present a list of identified messages with checkboxes, and to permit the user to select messages that are similar, as determined by the user. Arcode may be further configured to permit the user to name or select a tag to apply to such messages. From then, Arcode will automatically apply the tag to messages matching the learned filter.

Incorporation of Disparate Messaging Sources

Where Arcode is configured to operate with arbitrary extensions, such as Python extensions, messages from disparate sources, including different and/or new types of messages, may be integrated within a UI. For example, RSS feeds may be brought into the system and tagged, similar to e-mail messages.

Automatic Discovery of Message Account Settings (e.g., Port and Transport)

Arcode may include an account settings discovery process, which may replace multi-page communication-account-setup forms with a form requiring relatively little information such as a user account ID and password. A user account ID may include, for example, a user e-mail address or user account login name. An optional form may permit users with unusual email settings to provide additional information or hints. The Arcode settings discovery process uses the user ID and password to discover message settings for the user to send and receive electronic messages, such as e-mails. The information the user puts into the simple form may also be entered via a program run from a terminal console.

The Arcode settings discovery process may include one or more of the following processes, which may be performed for each account that is discovered: A) construction of a list of hosts; and, B) connections to each host to determine the user's incoming and outgoing email provider settings.

Construction of a List of Hosts

A base domain may be determined by the Arcode settings discovery process by parsing an email address input by the user. For example, bob@mail.aol.com is an example email address that may be parsed into a base username of "bob" and a base domain of mail.aol.com. The base domain may be used to check a database of known email providers (e.g. Gmail, Hotmail, AOL), indexed by domain patterns. This database may be maintained within Arcode source code. If the base domain matches a domain pattern, the list of hosts, and sometimes ports and other email settings, from that database item may be added to the settings collection. The settings collection may be used to attempt to connect to the user's incoming and outgoing email server. An example process of attempting to connect is described below.

If the base domain matches an entry in the database of known email providers, and the attempt to connect to the user's incoming and outgoing mail server is successful, the discovery process may be complete.

Otherwise, the list of hosts may be constructed by taking the base domain and constructing hostnames using the super-domain of the base domain and also a list of common prefixes. The list of common prefixes (such as imap.domain and smtp.domain) may be pre-determined by the Arcode settings discovery process, such as during design and testing. For example, if the base domain was mail.aol.com, a super-domain may be defined as aol.com. Using common prefixes may result in hostnames such as imap.aol.com and smtp.aol.com.

Additionally, a DNS query may be constructed to find any MX records corresponding to the base domain. Hosts in the MX records may be added to the list of hosts. Any optional host hints specified by the user may be added to the list of hosts. The list of hosts may be shortened by consolidating hosts that differ from each other only in numbers. This may help to reduce the number of connection attempts, which may shorten the discovery process. A DNS query may be performed on every host in the list of hosts.

In order to reduce or minimize the amount of time, The discovery process may be configured with respect to a maximum number of queries and/or an overall timeout time. This may reduce or minimize the amount of time of the discovery process.

Additionally, or alternatively, during execution of DNS queries, a check may be performed so that each host and each IP is only tried once.

It may be desirable to use the shortest possible hostname. The list of hostnames may thus be sorted by length.

Connections to Each Host to Determine the User's Incoming and Outgoing Email Provider Settings The Arcode settings discovery process may determine settings for the user's email provider by attempting to connect to a hostname multiple times using the user-provided password and combinations of different usernames, ports, and transports.

Possible usernames may include an email address and/or the base username parsed from the email address. For example, if the user-input e-mail address was bob@mail.aol.com, both "bob" and bob@mail.aol.com may be added to the list. Any optional user-provided username hints may also added to the username list. The optional user-provided username hint may be useful, for example, where the username for the mail server is significantly different than the email address. The list of usernames may adjusted for an email provider in a list of exceptions created by the Arcode settings discovery process, such as during design and testing.

Possible ports and transports may be constructed using a list compiled from internet standards (RFCs) and/or other email provider practices and possible server settings observed during the Arcode settings discovery process design and testing. To this list may be added any optional user-provided port and transports, which may be assigned higher priority on the list. When user-provided ports and transports exist, other ports and transports may be attempted unless prohibited by the email-specific options. Secure options may be assigned higher priority on the list than insecure options.

Setting may be determined using multiple connection attempts in a multi-threaded process. Multi-threading may reduce the time needed to determine or identify a proper connection. Some email providers have safeguards that are triggered by parallel connection attempts. To overcome this, all connection attempts to a given host/port combination may be scheduled or assigned to the same thread.

The discovery process may include setting a maximum number of simultaneous connection attempts. This may help to avoid overloading a remote server and/or triggering anti-spamming countermeasures.

If a connection attempt is successful using a particular combination of username, port, and transport, connection attempts with respect to any remaining combinations may be halted. This may reduce the amount of time taken during the settings discovery process.

If a successful connection to a host is made, additional commands may be attempted over that connection. If the additional commands are successful, the settings for that connection to the user's email provider may be saved for later use. For example, when the user subsequently logs in, the settings may be loaded from the saved settings instead of using settings discovery.

The setting discovery process may be implemented for both incoming and outgoing providers.

Crowd-Sourced Repository of Settings Discovery Results

When the Arcode settings discovery process determines the proper settings for a user's email provider, the Arcode client may make a copy of the information and may sanitize the data, such as by removing information in the settings which could potentially identify the user. The sanitized copy of the data may be inserted into a crowd-sourced repository which is accessible by other Arcode email client systems.

If a user's email provider has been successfully discovered from a previous user session, the Arcode settings discovery process may be omitted. Instead, the settings process can be seeded by the results of the previous successful discovery process which were crowd-sourced into an Arcode settings repository. The use of crowd-sourced e-mail settings may speed the settings discovery process and may use less computing and network resources. Arcode may be configured so that the settings discovery uses the crowd-sourced repository instead of a database of known providers, or in addition to known providers. In a situation where no entry is found in the crowd-sourced repository, the normal settings discovery process may be followed. In a situation where information from the crowd-sourced repository is used but the settings discovery is unsuccessful, the normal settings discovery may be followed.

A crowd-sourced repository may include multiple repositories. For a given user group, one of the crowd-sourced repositories may be designated as a primary repository, and another repository may be designated as an alternate repository. This may be useful, for example, where characteristics of various user groups (e.g. companies, communities, countries), result in a particular crowd-sourced repository being more relevant and useful. This may also be useful, for example, to located a given repository closer to a user group, such as locating a country-based repository proximate to the corresponding country, which may reduce processing time, access times, and/or reliability.

Arcode may be configured to bypass crowd-sourcing for the settings discovery process, which may be useful, for example, where Arcode is used in an isolated environment, such as on a secure or isolated network.

Arcode may be configurable to permit activation of an email provider only with respect to a particular settings discovery repository. This may be useful, for example, to provide an administrator with control over the email provider settings and/or to permit an administrator to control which email providers may be used. Such a central repository may provide an administrator with greater control, relative to a situation where email settings are maintained within a Arcode client or in a file on a user system, such as to update email provider settings information and/or to provide additional enterprise-level security.

Additional Optional Features of a Settings Discovery Repository

A crowd-sourced settings discovery repository may utilize feedback from unsuccessful results obtained by Arcode settings discovery attempts. For example, if an Arcode settings discovery process attempts to use settings from the Arcode repository but fails to connect, a maintenance process may take the failure into account and may determine whether to remove the settings for that email provider from the crowd-sourced repository. This may be useful, for example, prevent the Arcode settings discovery process from spending unnecessary time using the settings from the repository in a later attempt. The determination of whether to remove data after a failure may take into account various factors, such as the number of successful and unsuccessful attempts by the Arcode settings discovery process, the total number of attempts, and/or the amount of time that has passed between successful and/or unsuccessful attempts. This may be useful, for example, to avoid a relatively small number of unsuccessful attempts from removing email provider settings entries from the repository that have been successfully used for other attempts.

A specialized copy of the crowd-sourced settings discovery repository may be used as a utility for system administrators. This may be useful, for example, for administrators who have to deal with relatively large numbers of email servers. For example, a specialized copy of a repository may be used for compliance purposes, such in situations where an entity is to account for every email system and the settings of those email servers. In such a situation, the crowd-sourced repository may be configured, along with Arcode, to store additional information about individual users. This may be used to help with user email administration.

Additional Optional Electronic Message System Features

Arcode may be configured to provide one or more of the following features:
  aggregation of mail across accounts (e.g., a "meta-inbox");
  email summarization: produce better subject lines or summaries
  "automatically junk messages like this from this sender"
  promotion of common text entities into manipulable HTML in the message view; e.g., if we identify an address, we could add a link to map that address (or literally include a map in the HTML message display).
  delegation/sharing of permissions (e.g., an exec assistant could read/write mail on behalf of exec, spouses could share bill information);
  content-knowledgeable email search (e.g., by multipurpose internet mail extension (MIME) type (video, pdf, word doc, etc.), e.g., Franks phone number or address, attachments sent by Joe);
  integration of other messaging sources (e.g., RSS/Atom feeds, instant messaging, internet relay chat, XMPP, Jabber, Google Wave); and
  privacy/confidentiality tools.

Privacy/confidentiality tools may be configured to provide warnings about bad CC's (e.g., did you really mean to CC Walt Mossberg at the WSJ, or your officemate Walt Mossberg?).

Privacy/confidentiality tools may be configured to provide automatic signing of all outgoing mail (so that Arcode users can be sure of the sender's true identity).

Privacy/confidentiality tools may be configured to enforce corporate policy via a per-document DRM-like mechanism (e.g., confidential documents cannot be mailed outside the company).

Privacy/confidentiality tools may be configured to provide corporate-wide outgoing mail analysis (e.g., are employees sending bad or secret stuff out?).

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 1:
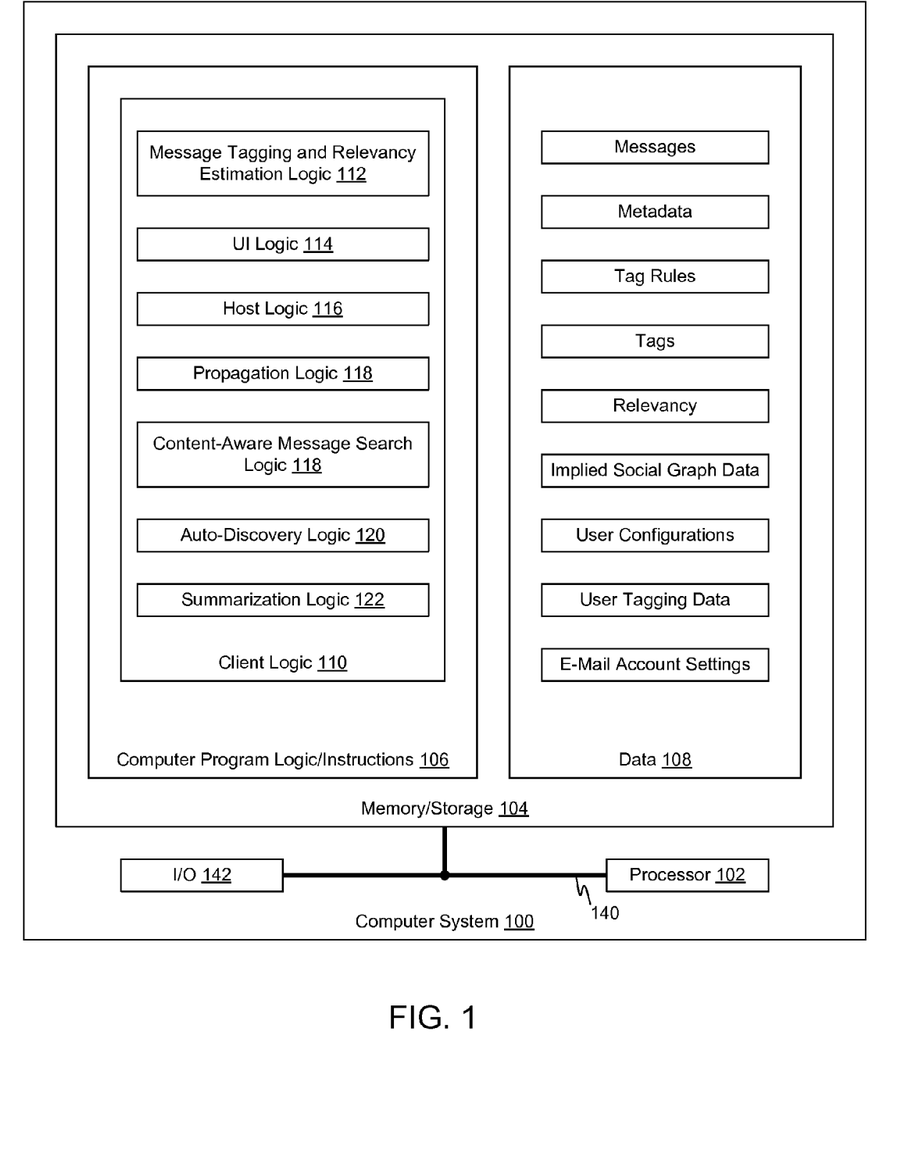
FIG. 1 is a block diagram of an exemplary computer system configured as an electronic messaging client.

FIG. 1 is a block diagram of an example computer system 100 configured as an electronic messaging client.

Computer system 100 includes one or more computer instruction processing units, illustrated here as a processor 102, to execute computer program product logic, also known as instructions, code, and software.

Computer system 100 includes one or more of memory, cache, registers, and storage (memory/storage) 104, including a computer readable medium having computer program product logic or instructions 106 stored thereon, to cause processor 102 to perform one or more functions in response thereto.

Memory/storage 104 further includes data 108 to be used by processor 102 in executing instructions 106, and/or generated by processor 102 in response to execution of instructions 106.

In FIG. 1, logic 106 includes client logic 110 to cause processor 102 to process electronic messages, such as described in one or more examples above.

Logic 110 may include message tagging and relevancy estimation logic 112 to cause processor 102 to tag messages and to determine message relevancy, such as described in one or more examples above.

Logic 112 may include hand-written parsers to tag messages produced from templates.

Logic 112 may include logic to identify and tag messages that are similar to one another with a common tag.

Logic 112 may include logic to implement client-side crowd-sourced tagging of messages. A server may include corresponding server-side crowd-sourced tagging logic.

Logic 112 may include cluster logic to implement one or more clustering techniques to cluster messages. Cluster logic may be configured to provide one or more of syntactic parsing, named entity and acronym recognition, sentiment analysis, and semantic role analysis.

Logic 112 may include logic to utilize an implied social graph, such as described in one or more examples above.

Logic 110 may include user interface (UI) logic 114 to cause processor 102 to provide web-page like interactive user interfaces based, at least in part, on message metadata, such as described in one or more examples above.

Logic 114 may include logic to aggregate a set of UIs in a tab view, such as described above.

Logic 110 may include host logic 116 to cause processor 102 to host a user-programmable messaging client. Host logic 116 may include a browser plug-in and/or application shell to host the messaging client. Host logic 116 may include a Python-extensible thick-client hosting system.

Logic 110 may include propagation logic 118 to cause processor 102 to use an implied messaging social graph to propagate information between messaging clients.

Logic 118 may include relevancy logic to perform an action with respect to a recipient message, based at least in part on an action taken by another recipient of the message (e.g., if user A immediately deleted message M, then user B may not care about it either if A is close to B in the social graph).

Logic 118 may include logic to share learned tagging behavior amongst clients (e.g., if one user's client has learned how to tag a set of messages, another users's client can benefit from that). Controls may be implemented to protect confidential information.

Logic 110 may include content-aware message search logic 118 to cause processor 102 to search a repository of messages based on content, such as by MIME type.

Logic 110 may include auto-discovery logic 120 to cause processor 102 to discover e-mail account settings, such as described in one or more examples above.

Logic 110 may include summarization logic 122 to cause processor 102 to generate and display more detailed and/or user-relevant e-mail summaries.

Computer system 100 may include a communications infrastructure 140 to communicate amongst components of computer system 100.

Computer system 100 may include an input/output controller 142 to communicate with one or more other systems over a communication channel or link, which may include an Internet communication link.

One or more features illustrated in, and or described with respect to FIG. 1 may be implemented alone and/or in various combinations with one another.

Figure 2:
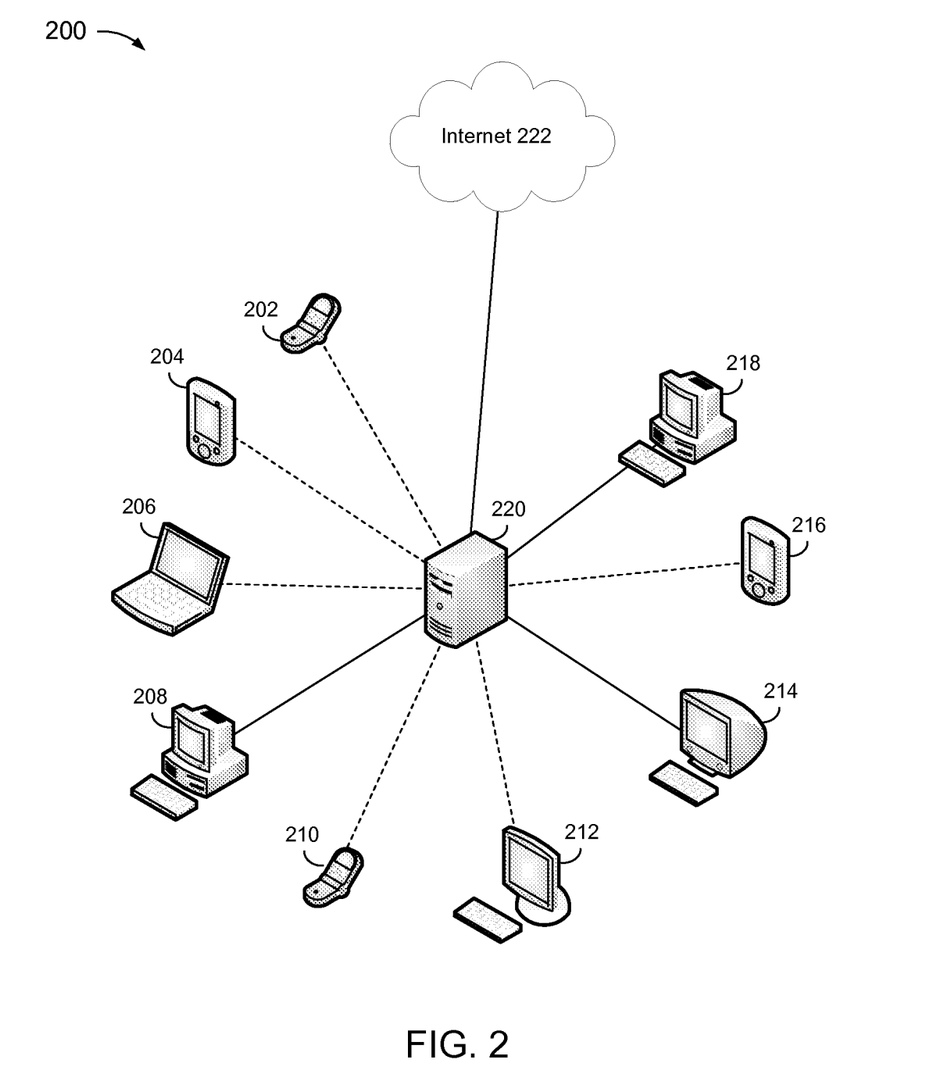
FIG. 2 is a block diagram of an electronic messaging environment 200.

FIG. 2 is a block diagram of an electronic messaging environment 200, including a plurality of communication devices 202 through 218, each configured as an Arcode messaging client, such as described in one or more examples above.

Environment 200 may include an Arcode server system 220 to implement one or more features amongst a plurality of devices 202 through 218, such as described in one or more examples above.

Devices 202 through 218 may be configured to send and receive messages between one another, and/or between other devices connected through Internet 222.

Figure 3:
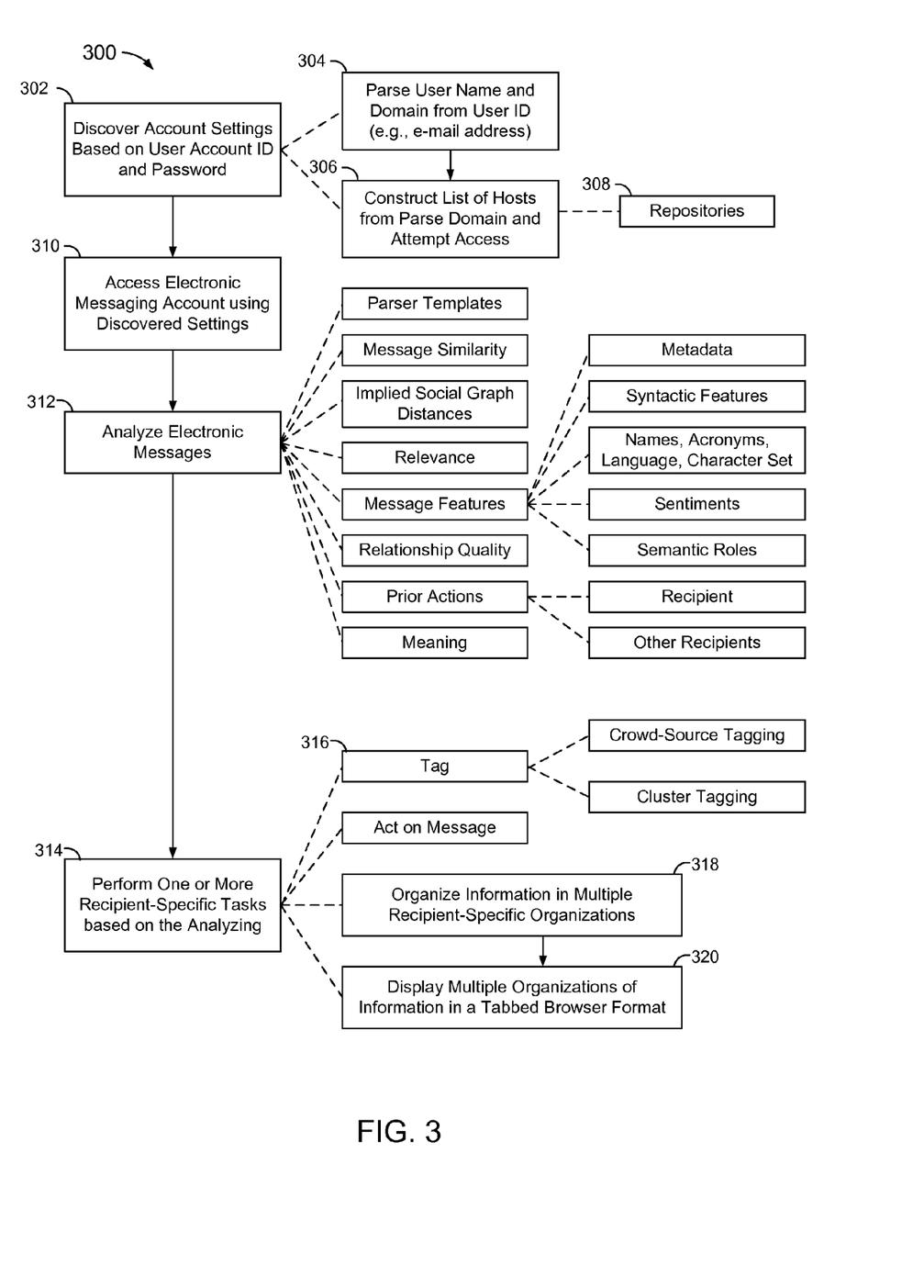
FIG. 3 is a flowchart of a method 300 of electronic messaging.

FIG. 3 is a flowchart of a method 300 of electronic messaging. One or more features illustrated in and/or described with respect to FIG. 3 may be implemented alone and/or in various combinations with one another. One or more features illustrated in and/or described with respect to FIG. 3 may be implemented within a apparatus, such as computer system, and may be implemented in a distributed fashion over a plurality of systems.

At 302, account settings are discovered based on a user account ID and a password. The user account ID may include an e-mail address, such as described in one or more examples above.

Discovery of account settings may include parsing a user name and domain from the user account ID at 304, such as described in one or more examples above.

Discovery of account settings may include constructing a list of hosts from the parsed domain, and attempting to access the listed hosts at 306, such as described in one or more examples above.

Discovery of account settings may include use of one or more repositories at 308, such as described in one or more examples above.

At 310, an electronic messaging account may be access using account settings discovered at 302.

At 312, electronic messages are analyzed. The analyzing may be performed with respect to historical messages and/or dynamically with respect to incoming and/or outgoing electronic messages. The analyzing may include one or more analysis techniques disclosed herein, a portion of which are shown in FIG. 3 for illustrative purposes.

At 314, one or more recipient-specific tasks may be performed based on the analyses performed at 312. The one or more tasks may include message-specific tasks and/or tasks based on a plurality of messages.

The one or more tasks may include one or more tasks disclosed herein, a portion of which are shown in FIG. 3 for illustrative purposes.

The one or more tasks may include tagging at 316, which may be performed based on one or more analyses performed at 312, such as described in one or more examples above.

Tagging at 316 may include crowd-source tagging and/or cluster tagging, such as described in one or more examples above.

The one or more tasks may include organizing information in multiple recipient-specific organizations at 318, and displaying the multiple organizations of information in a tabbed browser format at 320, such as described in one or more examples above.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:
1. A computer-implemented method, comprising:
analyzing electronic messages of a first user with respect to one or more features associated with the electronic messages;

associating descriptive tags with the electronic messages of the first user based on the analyzing; and performing tasks with respect to the electronic messages of the first user, on behalf of the first user, based on the descriptive tags associated with the respective electronic messages;

wherein the associating descriptive tags with the electronic messages of the first user includes learning electronic message tagging rules based one or more of a statistical machine learning technique and a parser, and associating the descriptive tags with the electronic messages of the first user based on features associated with the electronic messages and the learned electronic message tagging rules.

2. The method of claim 1, wherein:

the analyzing includes one or more of, parsing syntactic features associated with the electronic messages, recognizing named entities associated with the electronic messages, recognizing acronyms associated with the electronic messages, detecting sentiments expressed within the electronic messages, determining semantic roles associated with the electronic messages, and determining relationships amongst senders and recipients of the electronic messages with respect to an implied social graph; and the associating descriptive tags with the electronic messages of the first user further includes associating descriptive tags with the electronic messages based on one or more of the parsed syntactic features, the recognized named entities, the recognized acronyms, the sentiments, the determined semantic roles, and the determined relationships amongst the senders and recipients of the electronic messages with respect to the implied social graph.

3. The method of claim 1, wherein the performing includes:

extracting information from electronic messages that are tagged with a first descriptive tag; and presenting the extracted information within a user interface associated with the first descriptive tag.

4. The method of claim 3, wherein the first descriptive tag, the extracted information, and the user interface correspond to at least one of:

online purchases;
travel;
invitations;
newsletters;
offers;
promotions;
scheduled meetings;
invoices;
online payments;
banking/finance;
electronic messages awaiting a response from the first user;
informational electronic messages that are of high relevance to the first user; and
electronic messages that are of high relevance to the first user and that are awaiting a response from the first user.

5. The method of claim 3, wherein:

the associating descriptive tags with the electronic messages of the first user further includes associating the first descriptive tag with electronic messages that correspond to a message template;

the extracting includes parsing information from the electronic messages that are tagged with the first descriptive tag based on the message template; and the presenting includes presenting the parsed information within the user interface associated with the first descriptive tag.

6. The method of claim 3, wherein the extracting includes parsing information from the electronic messages that are tagged with the first descriptive tag based on user-provided parsing instructions.

7. The method of any one of claims 3 to 6, wherein the performing further includes:

providing a user-manipulable control within the user interface to retrieve information from a web site based on the extracted information; and presenting the retrieved information within the user interface.

8. The method of claim 3, wherein:

the associating descriptive tags with the electronic messages of the first user further includes clustering the electronic messages of the first user based on features of the respective electronic messages and associating the first descriptive tag to all electronic messages within a cluster of electronic messages; and the performing further includes extracting information from the electronic messages that are tagged with the first descriptive tag, and presenting the extracted information within the user interface associated with the first descriptive tag.

9. The method of claim 1, wherein the associating descriptive tags with the electronic messages of the first user further includes:

associating a user-identified tag to a user-identified electronic message;

identifying features of the user-identified electronic message; and associating the user-identified tag to other electronic messages that have features similar to the features of the user-identified electronic message.

10. The method of claim 3, wherein the performing further includes:

generating the user interface as a web-page-like interactive user-interface based at least in part on metadata associated with the electronic message.

11. The method of claim 10, wherein the performing further includes:

aggregating a plurality of the web-page-like interactive user-interfaces in a tab-view.

12. The method of claim 1, further including:

hosting a user-programmable electronic messaging client; and performing the analyzing and the performing within the hosted user-programmable electronic messaging client.

13. The method of claim 12, wherein the hosting includes:

hosting a Python-extensible thick-client electronic messaging system.

14. The method of claim 12, wherein the hosting includes one or more of:

using a browser plug-in; and
using an application shell.

15. The method of claim 1, wherein the performing includes:

permitting the first user to search the electronic messages of the first user based on a file name extension type associated with attachments to the electronic messages and information tagged within the electronic messages.

16. The method of claim 1, wherein the permitting includes the permitting the first user to search the electronic messages of the first user based on a file name extension type associated with attachments to the electronic messages.

17. The method of claim 1, wherein the permitting includes the permitting the first user to search the electronic messages of the first user based on information tagged within the electronic messages.

18. A computer-implemented method, comprising:
analyzing electronic messages of a first user with respect to one or more features associated with the electronic messages;
associating descriptive tags with the electronic messages of the first user based on the analyzing;
performing tasks with respect to the electronic messages of the first user, on behalf of the first user, based on the descriptive tags associated with the respective electronic messages; and
maintaining a repository of crowd-sourced tags and corresponding crowd-source tagging rules based on tags and tagging rules provided by users;
wherein the associating descriptive tags with the electronic messages of the first user includes associating a crowd-sourced tag to an electronic message of the first user based on a crowd-source tagging rule and a feature of the electronic message of the first user.

19. A computer-implemented method, comprising:
analyzing electronic messages of a first user with respect to one or more features associated with the electronic messages;
associating descriptive tags with the electronic messages of the first user based on the analyzing; and
performing tasks with respect to the electronic messages of the first user, on behalf of the first user, based on the descriptive tags associated with the respective electronic messages;
wherein the analyzing includes recursively following implied links between senders and recipients of electronic messages to construct an implied social graph of relationships amongst electronic message users, and determining relevance of an electronic message received by the first user, with respect to the first user, based on a relationship between a sender of the electronic message and the user within the implied social graph.

20. A computer-implemented method, comprising:
analyzing electronic messages of a first user with respect to one or more features associated with the electronic messages;
associating descriptive tags with the electronic messages of the first user based on the analyzing; and
performing tasks with respect to the electronic messages of the first user, on behalf of the first user, based on the descriptive tags associated with the respective electronic messages;
wherein the electronic messages of the first user include an electronic message sent to the first user and to a second user;
wherein the method further includes identifying a task performed with respect to the electronic message sent to the second user; and
wherein the performing includes selectively performing the task with respect to the electronic message sent to the first user based on a relationship between the first and second users within an implied social graph of electronic message users.

21. A computer-implemented method, comprising:
analyzing electronic messages of a first user with respect to one or more features associated with the electronic messages;
associating descriptive tags with the electronic messages of the first user based on the analyzing; and
performing tasks with respect to the electronic messages of the first user, on behalf of the first user, based on the descriptive tags associated with the respective electronic messages;
wherein the analyzing includes identifying a sender of a first electronic message received by the first user and determining relevance of the first electronic message with respect to the first user as a function of at least one of,
a relationship between the sender and the first user within an implied social graph of electronic message users,
a quality of the relationship between the sender and the first user,
a syntactic structure of the first electronic message,
metadata associated with the first electronic message,
a language used in the first electronic message,
a character set used in the first electronic message,
an action taken by the first user with respect to a second electronic message for which one or more features are similar to one or more corresponding features of the first electronic message, and
an action taken by a second user with respect to an electronic message received by the second user for which one or more features are similar to one or more corresponding features of the first electronic message.

22. The method of claim 21, wherein the determining relevance includes:
determining the relevance based at least in part on the relationship between the sender and the recipient within the implied social graph.

23. The method of claim 21, wherein the determining relevance includes:
determining the relevance based at least in part on the syntactic structure of the first electronic message.

24. The method of claim 21, wherein the determining relevance includes:
determining the relevance based at least in part on the metadata associated with the first electronic message.

25. The method of claim 21, wherein the determining relevance includes:
determining the relevance based at least in part on the language used in the first electronic message.

26. The method of claim 21, wherein the determining relevance includes:
determining the relevance based at least in part on the character set used in the first electronic message.

27. The method of claim 21, wherein the determining relevance includes:
determining the relevance based at least in part on the quality of the relationship between the sender and the recipient.

28. The method of claim 21, wherein the determining relevance includes:
determining the relevance based at least in part on the action taken by the recipient with respect to the second electronic message.

29. The method of claim 21, wherein the determining relevance includes:
determining the relevance based at least in part on the action taken by the other recipient with respect to the third electronic message.

30. The method of claim 21, wherein the determining relevance includes determining the relevance based on a combination of a plurality of,
the relationship between the sender and the recipient within the implied social graph,
the syntactic structure of the first electronic message,
the metadata associated with the first electronic message,
the language used in the first electronic message,
the character set used in the first electronic message,
the quality of the relationship between the sender and the recipient,
the action taken by the recipient with respect to the second electronic message, and
the action taken by the other recipient with respect to the third electronic message.

31. The method of claim 21, wherein the analyzing further includes:
determining a similarity between electronic messages based on one or more of,
relationships amongst senders and recipients of the electronic messages,
quality of the relationships amongst the senders and the recipients of the electronic messages,
syntactic structures of the electronic messages,
metadata associated with the electronic messages,
languages used in the electronic messages, and
character sets used in the electronic messages.

32. A computer-implemented method, comprising
analyzing electronic messages of a first user with respect to one or more features associated with the electronic messages;
associating descriptive tags with the electronic messages of the first user based on the analyzing; and
performing tasks with respect to the electronic messages of the first user, on behalf of the first user, based on the descriptive tags associated with the respective electronic messages;
wherein the analyzing includes,
parsing information from a first electronic message received by the first user,
assigning a meaning to the first electronic message based on the parsed information,
identifying a second electronic message received and tagged by a second user, and
defining a tag for the first electronic message based on a combination of the meaning of the first electronic message, the tag assigned to the second electronic message, and a relationship between the first and second users.

33. The method of claim 32, wherein the parsing includes:
parsing information from a body of the electronic message and from metadata associated with the electronic message.

34. The method of claim 32, wherein the analyzing further includes:
determining the relationship between the first and second recipients with respect to an implied social graph of electronic message users.

35. A computer-implemented method, comprising:
analyzing electronic messages of a first user with respect to one or more features associated with the electronic messages;
associating descriptive tags with the electronic messages of the first user based on the analyzing; and
performing tasks with respect to the electronic messages of the first user, on behalf of the first user, based on the descriptive tags associated with the respective electronic messages, wherein the performing includes organizing the electronic messages of the first user into a first organization based on metadata associated with the electronic messages and contents of the electronic messages, and presenting a first body of information associated with the electronic messages through a graphical user interface in accordance with the first organization.

36. The method of claim 35, wherein the performing further includes:
organizing the electronic messages of the first user into a second organization based on the metadata and contents; and
presenting a second body of information associated with the electronic messages through the graphical user interface in accordance with the second organization.

37. The method of claim 36, wherein the performing further includes:
presenting the first and second bodies of information under corresponding first and second tabs of the graphical user interface.

38. A computer-implemented method, comprising:
analyzing electronic messages of a first user with respect to one or more features associated with the electronic messages;
associating descriptive tags with the electronic messages of the first user based on the analyzing; and
performing tasks with respect to the electronic messages of the first user, on behalf of the first user, based on the descriptive tags associated with the respective electronic messages, wherein the performing includes,
permitting the first user to submit a query directed to one or more of message bodies, metadata, attachments, and previously assigned tags of the electronic messages of the first user, wherein the query includes a literal component and a reference to an unknown desired component associated with the literal component,
identifying a set of the electronic messages that include a reference to the literal component,
identifying a subset of the set of the electronic messages that include the desired component, and
returning information from the subset of electronic messages in response to the query.

39. An apparatus, comprising a processor and memory configured to:
analyze electronic messages of a first user with respect to one or more features associated with the electronic messages;
associate descriptive tags with the electronic messages of the first user based on analysis results, including to learn electronic message tagging rules based one or more of a statistical machine learning technique and a parser, and associate the descriptive tags with the electronic messages of the first user based on features associated with the electronic messages and the learned electronic message tagging rules; and
perform tasks with respect to the electronic messages of the first user, on behalf of the first user, based on the descriptive tags associated with the respective electronic messages.

40. A non-transitory computer readable medium encoded with a computer program including instructions to cause a processor to:
analyze electronic messages of a first user with respect to one or more features associated with the electronic messages;

associate descriptive tags with the electronic messages of the first user based on analysis results; and perform tasks with respect to the electronic messages of the first user, on behalf of the first user, based on the descriptive tags associated with the respective electronic messages;

wherein the computer program further includes instructions to cause the processor to learn electronic message tagging rules based one or more of a statistical machine learning technique and a parser, and associate the descriptive tags with the electronic messages of the first user based on features associated with the electronic messages and the learned electronic message tagging rules.

41. The non-transitory computer readable medium of claim 40, further including instructions to cause the processor to:

perform one more of parse syntactic features associated with the electronic messages, recognize named entities associated with the electronic messages, recognize acronyms associated with the electronic messages, detect sentiments expressed within the electronic messages, determine semantic roles associated with the electronic messages, and determine relationships amongst senders and recipients of the electronic messages with respect to an implied social graph; and associate descriptive tags with the electronic messages based on one or more of the parsed syntactic features, the recognized named entities, the recognized acronyms, the sentiments, the determined semantic roles, and the determined relationships amongst the senders and recipients of the electronic messages with respect to the implied social graph.

42. The non-transitory computer readable medium of claim 40, further including instructions to cause the processor to:

extract information from electronic messages that are tagged with a first descriptive tag; and present the extracted information within a user interface associated with the first descriptive tag.

43. The non-transitory computer readable medium of claim 42, wherein the first descriptive tag, the extracted information, and the user interface correspond to at least one of:

online purchases;
travel;
invitations;
newsletters;
offers;
promotions;
scheduled meetings;
invoices;
online payments;
banking/finance;
electronic messages awaiting a response from the first user;
informational electronic messages that are of high relevance to the first user; and
electronic messages that are of high relevance to the first user and that are awaiting a response from the first user.

44. The non-transitory computer readable medium of claim 42, further including instructions to cause the processor to:

associate the first descriptive tag with electronic messages that correspond to a message template;

the extracting includes parsing information from the electronic messages that are tagged with the first descriptive tag based on the message template; and the presenting includes presenting the parsed information within the user interface associated with the first descriptive tag.

45. The non-transitory computer readable medium of claim 42, further including instructions to cause the processor to:

parse information from the electronic messages that are tagged with the first descriptive tag based on user-provided parsing instructions.

46. The non-transitory computer readable medium of claim 42, further including instructions to cause the processor to:

provide a user-manipulable control within the user interface to retrieve information from a web site based on the extracted information; and present the retrieved information within the user interface.

47. The non-transitory computer readable medium of claim 42, further including instructions to cause the processor to:

cluster the electronic messages of the first user based on features of the respective electronic messages;

associate the first descriptive tag to all electronic messages within a cluster of electronic messages;

extract information from the electronic messages that are tagged with the first descriptive tag; and present the extracted information within the user interface associated with the first descriptive tag.

48. The non-transitory computer readable medium of claim 40, further including instructions to cause the processor to:

associate a user-identified tag to a user-identified electronic message;

identify features of the user-identified electronic message; and associate the user-identified tag to other electronic messages that have features similar to the features of the user-identified electronic message.

49. The non-transitory computer readable medium of claim 42, further including instructions to cause the processor to:

generate the user interface as a web-page-like interactive user-interface based at least in part on metadata associated with the electronic message.

50. The non-transitory computer readable medium of claim 49, further including instructions to cause the processor to:

aggregate a plurality of the web-page-like interactive user-interfaces in a tab-view.

51. The non-transitory computer readable medium of claim 40, further including instructions to cause the processor to:

host a user-programmable electronic messaging client; and analyze the electronic messages of the first user and perform the tasks within the hosted user-programmable electronic messaging client.

52. The non-transitory computer readable medium of claim 51, further including instructions to cause the processor to:

host the user-programmable electronic messaging client as a Python-extensible thick-client electronic messaging system.

53. The non-transitory computer readable medium of claim 51, further including instructions to cause the processor to:
  host the user-programmable electronic messaging client using one or more of a browser plug-in and an application shell.

54. The non-transitory computer readable medium of claim 40, further including instructions to cause the processor to:
  permit the first user to search the electronic messages of the first user based on a file name extension type associated with attachments to the electronic messages and information tagged within the electronic messages.

55. The non-transitory computer readable medium of claim 40, further including instructions to cause the processor to:
  permit the first user to search the electronic messages of the first user based on a file name extension type associated with attachments to the electronic messages.

56. The non-transitory computer readable medium of claim 40, further including instructions to cause the processor to:
  permit the first user to search the electronic messages of the first user based on information tagged within the electronic messages.

57. A non-transitory computer readable medium encoded with a computer program including instructions to cause a processor to:
  analyze electronic messages of a first user with respect to one or more features associated with the electronic messages;
  associate descriptive tags with the electronic messages of the first user based on analysis results; and
  perform tasks with respect to the electronic messages of the first user, on behalf of the first user, based on the descriptive tags associated with the respective electronic messages;
  wherein the computer program further includes instructions to cause the processor to maintain a repository of crowd-sourced tags and corresponding crowd-source tagging rules based on tags and tagging rules provided by users, and associate a crowd-sourced tag to an electronic message of the first user based on a crowd-source tagging rule and a feature of the electronic message of the first user.

58. A non-transitory computer readable medium encoded with a computer program including instructions to cause a processor to:
  analyze electronic messages of a first user with respect to one or more features associated with the electronic messages, including to recursively follow implied links between senders and recipients of electronic messages to construct an implied social graph of relationships amongst electronic message users, and determine relevance of an electronic message received by the first user, with respect to the first user, based on a relationship between a sender of the electronic message and the user within the implied social graph;
  associate descriptive tags with the electronic messages of the first user based on analysis results; and
  perform tasks with respect to the electronic messages of the first user, on behalf of the first user, based on the descriptive tags associated with the respective electronic messages.

59. A non-transitory computer readable medium encoded with a computer program including instructions to cause a processor to:
  analyze electronic messages of a first user with respect to one or more features associated with the electronic messages;
  associate descriptive tags with the electronic messages of the first user based on analysis results; and
  perform tasks with respect to the electronic messages of the first user, on behalf of the first user, based on the descriptive tags associated with the respective electronic messages;
  wherein the electronic messages of the first user include an electronic message sent to the first user and to a second user, and wherein the computer program further include instructions to cause the processor to,
    identify a task performed with respect to the electronic message sent to the second user, and
    selectively perform the task with respect to the electronic message sent to the first user based on a relationship between the first and second users within an implied social graph of electronic message users.

60. A non-transitory computer readable medium encoded with a computer program including instructions to cause a processor to:
  analyze electronic messages of a first user with respect to one or more features associated with the electronic messages, including to identify a sender of a first electronic message received by the first user and determine relevance of the first electronic message with respect to the first user as a function of at least one of,
    a relationship between the sender and the first user within an implied social graph of electronic message users,
    a quality of the relationship between the sender and the first user,
    a syntactic structure of the first electronic message,
    metadata associated with the first electronic message,
    a language used in the first electronic message,
    a character set used in the first electronic message,
    an action taken by the first user with respect to a second electronic message for which one or more features are similar to one or more corresponding features of the first electronic message, and
    an action taken by a second user with respect to an electronic message received by the second user for which one or more features are similar to one or more corresponding features of the first electronic message;
  associate descriptive tags with the electronic messages of the first user based on analysis results; and
  perform tasks with respect to the electronic messages of the first user, on behalf of the first user, based on the descriptive tags associated with the respective electronic messages.

61. The non-transitory computer readable medium of claim 60, further including instructions to cause the processor to:
  determine the relevance based at least in part on the relationship between the sender and the recipient within the implied social graph.

62. The non-transitory computer readable medium of claim 60, further including instructions to cause the processor to:
  determine the relevance based at least in part on the syntactic structure of the first electronic message.

63. The non-transitory computer readable medium of claim 60, further including instructions to cause the processor to:

determine the relevance based at least in part on the metadata associated with the first electronic message.

64. The non-transitory computer readable medium of claim 60, further including instructions to cause the processor to:
determine the relevance based at least in part on the language used in the first electronic message.

65. The non-transitory computer readable medium of claim 60, further including instructions to cause the processor to:
determine the relevance based at least in part on the character set used in the first electronic message.

66. The non-transitory computer readable medium of claim 60, further including instructions to cause the processor to:
determine the relevance based at least in part on the quality of the relationship between the sender and the recipient.

67. The non-transitory computer readable medium of claim 60, further including instructions to cause the processor to:
determine the relevance based at least in part on the action taken by the recipient with respect to the second electronic message.

68. The non-transitory computer readable medium of claim 60, further including instructions to cause the processor to:
determine the relevance based at least in part on the action taken by the other recipient with respect to the third electronic message.

69. The non-transitory computer readable medium of claim 60, further including instructions to cause the processor to:
determine the relevance based on a combination of a plurality of,
the relationship between the sender and the recipient within the implied social graph,
the syntactic structure of the first electronic message,
the metadata associated with the first electronic message,
the language used in the first electronic message,
the character set used in the first electronic message,
the quality of the relationship between the sender and the recipient,
the action taken by the recipient with respect to the second electronic message, and
the action taken by the other recipient with respect to the third electronic message.

70. The non-transitory computer readable medium of claim 60, further including instructions to cause the processor to:
analyze the electronic messages of the first user to determine a similarity between electronic messages based on one or more of,
relationships amongst senders and recipients of the electronic messages,
quality of the relationships amongst the senders and the recipients of the electronic messages,
syntactic structures of the electronic messages,
metadata associated with the electronic messages,
languages used in the electronic messages, and
character sets used in the electronic messages.

71. A non-transitory computer readable medium encoded with a computer program including instructions to cause a processor to:
analyze electronic messages of a first user with respect to one or more features associated with the electronic messages;
associate descriptive tags with the electronic messages of the first user based on analysis results; and
perform tasks with respect to the electronic messages of the first user, on behalf of the first user, based on the descriptive tags associated with the respective electronic messages;
wherein the computer program further includes instructions to cause the processor to, parse information from a first electronic message received by the first user,
assign a meaning to the first electronic message based on the parsed information,
identify a second electronic message received and tagged by a second user, and
define a tag for the first electronic message based on a combination of the meaning of the first electronic message, the tag assigned to the second electronic message, and a relationship between the first and second users.

72. The non-transitory computer readable medium of claim 71, further including instructions to cause the processor to:
parse information from a body of the electronic message and from metadata associated with the electronic message.

73. The non-transitory computer readable medium of claim 71, further including instructions to cause the processor to:
determine the relationship between the first and second recipients with respect to an implied social graph of electronic message users.

74. A non-transitory computer readable medium encoded with a computer program including instructions to cause a processor to:
analyze electronic messages of a first user with respect to one or more features associated with the electronic messages;
associate descriptive tags with the electronic messages of the first user based on analysis results; and
perform tasks with respect to the electronic messages of the first user, on behalf of the first user, based on the descriptive tags associated with the respective electronic messages, including to organize the electronic messages of the first user into a first organization based on metadata associated with the electronic messages and contents of the electronic messages, and present a first body of information associated with the electronic messages through a graphical user interface in accordance with the first organization.

75. The non-transitory computer readable medium of claim 74, further including instructions to cause the processor to:
organize the electronic messages of the first user into a second organization based on the metadata and contents; and
present a second body of information associated with the electronic messages through the graphical user interface in accordance with the second organization.

76. The non-transitory computer readable medium of claim 74, further including instructions to cause the processor to:
present the first and second bodies of information under corresponding first and second tabs of the graphical user interface.

77. A non-transitory computer readable medium encoded with a computer program including instructions to cause a processor to:
- analyze electronic messages of a first user with respect to one or more features associated with the electronic messages;
- associate descriptive tags with the electronic messages of the first user based on analysis results; and
- perform tasks with respect to the electronic messages of the first user, on behalf of the first user, based on the descriptive tags associated with the respective electronic messages, including to,
  - permit the first user to submit a query directed to one or more of message bodies, metadata, attachments, and previously assigned tags of the electronic messages of the first user, wherein the query includes a literal component and a reference to an unknown desired component associated with the literal component,
  - identify a set of the electronic messages that include a reference to the literal component,
  - identify a subset of the set of the electronic messages that include the desired component, and
  - return information from the subset of electronic messages in response to the query.

78. An apparatus, comprising a processor and memory configured to:
- analyze electronic messages of a first user with respect to one or more features associated with the electronic messages;
- associate descriptive tags with the electronic messages of the first user based on analysis results; and
- perform tasks with respect to the electronic messages of the first user, on behalf of the first user, based on the descriptive tags associated with the respective electronic messages;
- wherein the processor and memory are further configured to maintain a repository of crowd-sourced tags and corresponding crowd-source tagging rules based on tags and tagging rules provided by users, and associate a crowd-sourced tag to an electronic message of the first user based on a crowd-source tagging rule and a feature of the electronic message of the first user.

* * * * *